US008419410B2

(12) United States Patent
Pollard

(10) Patent No.: US 8,419,410 B2
(45) Date of Patent: Apr. 16, 2013

(54) MATERIAL SUPPLY FOR A TABLET PRESSING MACHINE AND A TABLET PRESSING MACHINE

(75) Inventor: Stephen John Pollard, Passmonds Rochdale (GB)

(73) Assignee: BWI PLC, Merseyside (GB)

( * ) Notice: Subject to any disclaimer, the term of this patent is extended or adjusted under 35 U.S.C. 154(b) by 0 days.

(21) Appl. No.: 13/154,012

(22) Filed: Jun. 6, 2011

(65) Prior Publication Data

US 2011/0318444 A1 Dec. 29, 2011

Related U.S. Application Data

(63) Continuation of application No. 12/910,567, filed on Oct. 22, 2010, now abandoned, which is a continuation of application No. PCT/EP2009/054924, filed on Apr. 23, 2009.

(30) Foreign Application Priority Data

Apr. 23, 2008 (DE) ......................... 10 2008 001 350
Apr. 23, 2008 (DE) ................................ 10 2008 372

(51) Int. Cl.
*B29C 43/08* (2006.01)

(52) U.S. Cl.
USPC ............................ 425/256; 425/345; 425/448

(58) Field of Classification Search .................... 425/78, 425/219, 256, 257, 258, 259, 260, 261, 135, 425/145, 345, 447, 448
See application file for complete search history.

(56) References Cited

U.S. PATENT DOCUMENTS 5,858,415 A * 1/1999 Bequette et al. ................ 425/78
6,612,827 B1 * 9/2003 Minke et al. .................. 425/345
6,656,416 B2 * 12/2003 Nakamura et al. .............. 425/78
6,972,105 B2 * 12/2005 Boeckx et al. ................ 425/345
7,381,356 B2 * 6/2008 Shimada et al. .............. 425/345

FOREIGN PATENT DOCUMENTS

DE 2063083 A1 7/1972
DE 10218220 C1 6/2003
DE 102005030311 B3 11/2006
DE 102006023333 B3 11/2007
EP 1053863 A 11/2000
GB 461826 A 2/1937
GB 869493 A 5/1961
JP 63299892 12/1988
WO WO 2007/131632 A1 11/2007

OTHER PUBLICATIONS

International Search Report of the International Searching Authority for International Application No. PCT/EP2009/054924, Aug. 19, 2009.
International Preliminary Report on Patentability for International Application No. PCT/EP2009/054924, Oct. 26, 2010.

(Continued)

*Primary Examiner* — Richard Crispino
*Assistant Examiner* — Thukhanh Nguyen
(74) *Attorney, Agent, or Firm* — McCarter & English, LLP

(57) ABSTRACT

The present invention relates to a material supply for a tablet pressing machine with a rotor which comprises a matrix disc. A plurality of matrices is arranged within the matrix disc. The material supply is provided to supply material which is to be tabletted to the matrices formed in the matrix disc. A further subject of the invention is a tablet pressing machine which comprises a material supply according to the invention.

17 Claims, 5 Drawing Sheets

OTHER PUBLICATIONS

International Search Report of the International Searching Authority for International Application No. PCT/EP2009/054871, Aug. 19, 2009.

International Preliminary Report on Patentability for International Application No. PCT/EP2009/054871, Oct. 26, 2010.

* cited by examiner

MATERIAL SUPPLY FOR A TABLET PRESSING MACHINE AND A TABLET PRESSING MACHINE

CROSS-REFERENCE TO RELATED APPLICATIONS

This application is a continuation of U.S. patent application Ser. No. 12/910,567, filed on Oct. 22, 2010, now abandoned, which is a continuation of International Patent Application PCT/EP2009/054924, filed on Apr. 23, 2009 and claims priority to German Patent Application 10 2008 001 350.1, filed Apr. 23, 2008 and German Patent Application 10 2008 372.2, filed on Apr. 23, 2008. The entire disclosure of all three of these applications is incorporated by reference herein.

FIELD OF THE INVENTION

The present invention relates to a tablet pressing machine. In particular, the invention relates to a tablet pressing machine in which the matrix disc of the rotor is arranged in a closed housing, in which in addition a spraying device is arranged, by which for cleaning purposes a cleaning fluid, such as water for example, can be sprayed inside the closed housing for cleaning purposes. The invention further relates to a material supply for a tablet pressing machine, which is provided to supply material which is to be tabletted to matrices formed in a matrix disc of a tablet pressing machine. Finally, the present invention relates to a method for cleaning a closed housing of a tablet pressing machine, in which the matrix disc of the tablet pressing machine is arranged.

BACKGROUND OF THE INVENTION

Tablet pressing machines are known in various numbers from the prior art. Basically, generic tablet pressing machines have a rotor unit which is practically always carried by a driven spindle and which, together with the spindle, rotates about a vertically aligned rotation axis D. In addition, such a rotor unit comprises a matrix disc in which a plurality of matrices or matrix mountings are formed. The matrix mountings are provided to hold separately constructed matrices in them. Above and below the matrix disc, generally upper and lower die mountings are arranged, in which a plurality of upper and lower dies are arranged which are displaceable in the direction of the rotation axis D and engage by their ends into the matrices of the matrix disc. The upper and lower dies are actuated on a rotation of the rotor unit by cams which can be connected for example mechanically securely with a frame of the tablet pressing machine. However, the cams may also be constructed as discs which are rotatably mounted on the frame of the tablet pressing machine.

For the production of tablets, powdery material is supplied via a material supply to the matrices which are formed in the matrix disc, which material is then compacted by the upper and lower dies engaging into the matrices. With a sufficient compacting of the powdery material, a tablet is obtained which is then ejected from the matrix by a corresponding ejection movement of an upper or lower die and is guided out of the tablet pressing machines by suitable mechanical devices.

As the material which is to be tabletted can never be processed at 100% to tablets and, furthermore, contains in part highly effective medical components which, on inhalation, can be problematic, ranging up to being hazardous for an operator of the tablet pressing machine, a careful cleaning of the tablet pressing machine must be carried out when the material which is to be tabletted is changed, i.e. with a batch change. To do this, it is important in particular to bind powdery material which is present in the air and also on the rotor of the tablet pressing machine and in its environment, so that it can no longer be inhaled by the operating personnel. To do this, tablet pressing machines are known from the prior art which have a closed housing area in which at least the matrix disc of the rotor, but generally in addition also the upper and lower die mountings in addition to the associated dies and the actuating cams of the upper and lower dies are arranged. In order to bind the powdery material which is not processed into tablets, a spraying device for a cleaning fluid, such as water for example, is arranged in the closed housing of the tablet pressing machine. On a batch change, before the closed housing area is opened, a cleaning fluid is sprayed which washes out the suspended particles situated in the air and, in addition, as far as possible wets all the surfaces arranged in the region of the closed housing, to bind powdery material residues which are situated thereon. The powdery material residues which are bound in the cleaning fluid can then no longer get the air, but rather the closed housing area can now be opened and, for example, cleaned manually by the operating personnel.

Generally, an extensive dismantling of the tablet pressing machine is necessary for the cleaning method, which entails in part considerable down times, causing relevant costs. Any reduction in the down time during a batch change—for example by simplifying the cleaning method—therefore immediately brings financial advantages with it.

As already mentioned above, in a generic tablet pressing machine the material which is to be tabletted is directed to the matrices in the matrix disc via a material supply. Generally, such a material supply directs the powdery material on the upper side to the matrices formed in the matrix disc. To do this, a supply opening is formed in the material supply, which frequently overlaps several matrices of the matrix disc which are arranged one behind the other, and which material supply is often surrounded by a seal. This seal seals off the spacial area surrounded by the supply opening with respect to the environment. The seal is commonly guided at a minimal distance over the upper side of the matrix disc. Alternatively, sliding seals are also used. In both types of construction, however, a high-precision adjustment of the material supply and of the seal contained therein relative to the rotor unit is indispensable, in order to avoid excess wear on the matrix disc itself, on the seal or on the material supply. Also, the material abrasion which is inevitably entailed with the wear can be a problem when it is carried into the tablets which are produced on the tablet pressing machine. For this reason, the material supply in the constructions previously known from the prior art must be newly aligned accurately after the machine has been dismantled for example for cleaning purposes. This adjustment process here is frequently very complex and hence time-consuming. A dismantling of the material supply is, however, generally indispensable in the generic tablet pressing machines previously known from the prior art, because otherwise the powdery material residues situated in the region of the material supply, in particular the supply opening on the inside, and the contact region with the matrix disc, can not be detected during the cleaning method.

SUMMARY OF THE INVENTION

In one aspect, the present invention relates to providing a material supply for a tablet pressing machine which simplifies a cleaning of the tablet pressing machine at a batch change. Furthermore, a tablet pressing machine is to be indicated, the cleaning of which is simplified compared with the tablet pressing machines previously known from the prior art.

This problem is solved by a material supply for a tablet pressing machine and by a tablet pressing machine.

A material supply according to the invention is provided for a tablet pressing machine which has a rotor which comprises a matrix disc. A plurality of matrices is arranged therein. The material supply is provided to supply (powdery) material which is to be tabletted to the matrices which are formed in the matrix disc. According to the invention, the material supply comprises a carrier part and a supply part, in which the position of the carrier part relative to the matrix disc of the rotor is able to be fixed mechanically. In addition, the supply part is mounted by means of at least one variable mounting part on the carrier part, in which the variable mounting part is arranged to set the distance of the supply part to the rotor automatically to a preset value.

In a preferred further development, the variable mounting part of the material supply has a pressure spring. In addition, the supply part of the material supply can have a supply opening for the material which is to be tabletted and a seal at least partially embracing the supply opening can be arranged between the supply part and the matrix disc. Particular advantages are produced when the seal is able to be acted upon with a defined pre-stressing force against the surface of the matrix disc, and when the pressure spring counteracts the pre-stressing of the seal. Here, the pre-stressing force can be produced by means of elastic deformation of the seal, but it can also be produced by means of a separately constructed spring element.

In a preferred further development, the variable mounting part of the material supply comprises a pneumatically, hydraulically or electromechanically operated lifting cylinder. When a pressure spring is provided on the variable mounting part, then this preferably acts contrary to the movement of the lifting cylinder, which is actuated for example pneumatically.

It is also preferred on the material supply that an adjustment device is provided which permits a setting of the position of the carrier part in at least the vertical direction. Here, this adjustment device can be constructed for example as a micrometer screw.

Furthermore, the material supply preferably comprises a vertical adjustment device, by means of which the vertical position of the supply part on the carrier part can be adjusted mechanically.

In a particularly preferred further development of the material supply according to the invention, its supply part can assume an operating position and a cleaning position. Here, a transfer of the supply part from the operating position into the cleaning position can take place in particular by a pressure application of the lifting cylinders.

A tablet pressing machine according to the invention comprises a rotor with a matrix disc in which a plurality of matrices is arranged, and a material supply according to the invention. In particular, on the tablet pressing machine according to the invention a sealed housing can be provided, in which at least the matrix disc, the supply part of the material supply and a spraying device for a cleaning fluid are arranged. When a corresponding material supply is provided, the tablet pressing machine can assume an operating position and a cleaning position. Here, the distance of the supply part from the upper side of the matrix disc assumes a first value d1 in the operating position, and a second value d2 in the cleaning position.

Preferred further developments of the material supply according to the invention will be described below in connection with the additionally claimed tablet pressing machine. These preferred further developments are, however, also limited to material supplies for a generic tablet pressing machine—i.e. without the features of a generic tablet pressing machine—the subject matter of the present application.

A tablet pressing machine according to the invention has a rotor which comprises a matrix disc. In the latter, a plurality of matrices is arranged which are formed directly in the matrix disc or else can be constructed as separate inserts. In addition, the tablet pressing machine comprises a material supply which is provided to supply the material which is to be tabletted to the matrices which are formed in the matrix disc. According to the invention, provision is now made that the material supply comprises a carrier part and a supply part. Here, the position of the carrier part relative to the rotor of the tablet pressing machine is able to be fixed mechanically, preferably after an adjustment of the carrier part relative to the rotor has taken place. The supply part of the material supply, on the other hand, is mounted on the carrier part by means of at least one variable mounting part, in which the variable mounting part is arranged to set a variable distance of the supply part to the rotor. This adjustability is to be developed so that in particular when the invention of the tablet pressing machine according to the invention is at a standstill, the distance of the supply part from the rotor can be altered at least in the vertical direction preferably by remote control by an operator. In particular, such a change in distance is to be realizable by means of the at least one variable mounting part, by the supply part being raised from the upper side of the matrix disc. Hereby, the contact region between the supply part and the rotor, here in particular therefore the matrix disc, becomes accessible for cleaning. Generally, the at least one variable mounting part will permit a remote-controlled vertical movement of the supply part by fractions of a millimeter up to several millimeters. When the vertical movement in fact amounts to some millimeters, the cleaning of the rotor and of the supply part can be carried out very easily, because in this case suitable cleaning equipment such as cleaning cloths can be introduced into the intermediate space between the supply part and the matrix disc. The introduction of the cleaning fluid by means of the spraying device is also distinctly eased.

In a particularly preferred development of the invention, the variable mounting part is arranged to tilt the supply part in a defined manner with respect to the rotor, in particular such that the supply part is raised substantially in its contact region with the matrix disc.

A mounting of the supply part on the carrier part by means of two variable mounting parts and a fixed mounting part which are arranged so that they span one plane has provided to be particularly advantageous. In particular, the mounting parts can be provided on the carrier part. The supply part is then placed onto three contact points which are formed by the three mounting parts arranged on the carrier part. Particularly preferably, a tilting movement of the supply part on each individual mounting part is possible here, so that by different deflection of the variable mounting parts in the vertical direction, the supply part is raised on the one hand and on the other hand can be tilted. If, however, an angular mobility of the supply part on the mounting parts is not provided, then at least a movement of the supply part in the vertical direction can be realized in the simplest manner. To do this, three variable mounting parts are then provided, which are deflected in the same direction.

It has proved to be particularly advantageous when the at least one variable mounting part comprises a pneumatically actuated lifting cylinder which, with an application of pressure for example by means of compressed air, carries out an upwardly directed lifting movement. In addition, however, of course hydraulic or electromechanical actuators can also be used.

In a particularly preferred development, the variable mounting part comprises, in addition to a pneumatically actuated lifting cylinder, a pressure spring which generates a force directed in opposition to the pneumatically actuated movement of the lifting cylinder, which force acts on the lifting cylinder. The pressure spring here is preferably a compression spring, the restoring force of which is substantially independent of its compression at least over a certain deflection range. An example of such a pressure spring is a multimodal corrugated disc.

In a particularly preferred development, the supply part is mounted on the carrier part of the material supply by means of the at least one variable mounting part so that the same bearing force of the supply part is always produced on the upper side of the matrix disc, irrespective of the actual deflection of the variable mounting parts. In an alternative development, the material supply is constructed so that when the supply part is placed onto the carrier part, the distance of the supply part to the rotor, in particular to the matrix disc, is automatically set to a preset value.

The first-mentioned development is particularly advantageous in so far as the supply part of the material supply has a seal which is in mechanical contact with the upper side of the matrix disc during the operation of the tablet pressing machine and is therefore a sliding seal. The second-mentioned development has advantages in particular when a mechanical contact is to be avoided between the supply part, in particular a seal provided on the supply part, and the matrix disc of the rotor. To do this, under all operating conditions of the tablet pressing machine a minimum distance can be maintained between the supply part, in particular a seal arranged in the supply part, and the matrix disc.

The first-mentioned development has advantages in particular when a sliding seal is provided on the supply part, which seal is pre-stressed for example by means of a suitably constructed spring against the surface of the matrix disc. To do this, the seal can have a separately constructed inherent for example pressure spring. Alternatively, however, a spring effect of the material used for the seal can be utilized. Thus, for example, a metallic sliding seal can have a suitable elastic deformability.

In a further advantageous further development of the tablet pressing machine according to the invention, an adjustment device is provided which allows the position of the carrier part to be set at least in the vertical direction. Such an adjustment device can be a micrometer screw for example. In particular, a two-stage micrometer screw can be provided here, which in a first stage allows a coarse setting of the position in the range of millimeters. A second stage then allows a fine adjustment of the position in the range of fractions of millimeters, preferably in the range of micrometers.

In a further advantageous development of the tablet pressing machine according to the invention, a fixing unit is provided by means of which the supply part can be fixed mechanically on the carrier part. In particular, such a fixing unit can be one or more manually operable setscrews which engage with their shaft for example into the lifting cylinders of the variable mounting parts. Alternatively, the fixing unit can also be constructed as a bayonet closure which is to be operated manually.

In addition, a method according to the invention is proposed for cleaning a tablet pressing machine which has a rotor which comprises a matrix disc in which a plurality of matrices is arranged. In addition, the tablet pressing machine comprises a material supply which is provided to supply material which is to be tabletted to the matrices which are formed in the matrix disc. The method has the following method steps:

1. Provision of a material supply which comprises a carrier part and a supply part, in which a) the position of the carrier part relative to the matrix disc of the rotor is able to be fixed mechanically, and b) the supply part is mounted on the carrier part by means of at least one variable mounting part, and
2. Increasing of the distance of the supply part to the matrix disc of the rotor by means of the variable mounting part preferably in the vertical direction.

In a preferred further development of the method according to the invention, at least the matrix disc of the rotor, the supply part of the material supply and a spraying device for a cleaning fluid are arranged in a closed housing. In a further method step 3, a cleaning fluid is sprayed in the closed housing by means of the spraying device, with the supply part being in the (raised/tilted) cleaning state.

The method is therefore particularly suited to being carried out on a tablet pressing machine according to the invention, or on a generic tablet pressing machine using a material supply according to the invention.

BRIEF DESCRIPTION OF THE DRAWINGS

Further advantages and features of the invention will be apparent from the sub-claims and from the example embodiment which is described in further detail below with the aid of the drawings, in which:

DETAILED DESCRIPTION OF THE PREFERRED EMBODIMENTS

Figure 1:
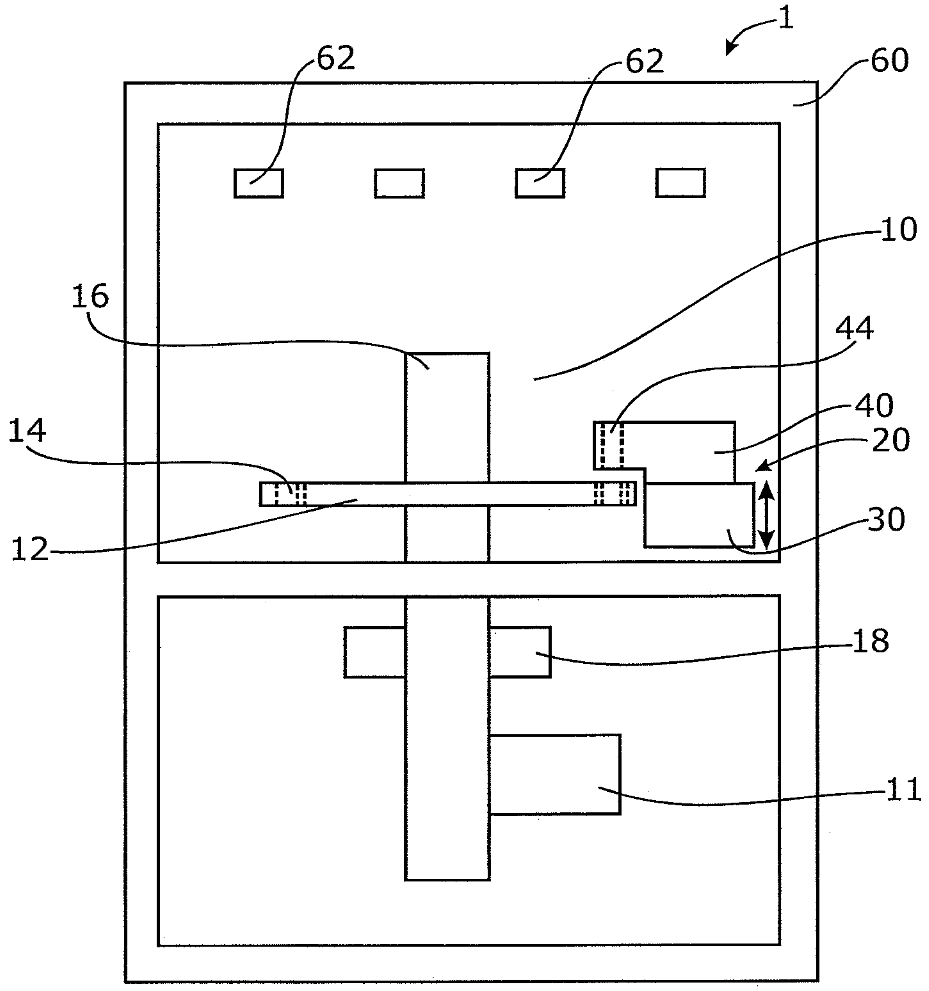
FIG. 1 shows a diagrammatic illustration of a tablet pressing machine according to the invention, in lateral sectional illustration.

A tablet pressing machine 1 according to the invention can be seen from FIG. 1 in a simplified sectional illustration. The tablet pressing machine 1 has a rotor 10 which comprises a spindle 16 which is rotatably mounted in a bearing 18 in the frame 64 of the tablet pressing machine 1. The frame 64 can consist for example of a tube frame which gives the tablet pressing machine 1 the necessary mechanical stability. In addition, the rotor 10 comprises a matrix disc 12 in which a plurality of matrices 14 are arranged, spaced equally apart. Here, the matrices 14 can be formed directly as a recess in the matrix disc 12, but they may also be constructed as separate parts which are inserted into recesses, constructed in a complementary manner, in the matrix disc 12 (as illustrated). The matrix disc 12 is preferably formed in a single piece, but it is also readily possible to use matrix discs which are formed in several parts. The spindle 16 of the rotor 10 is driven by means of a motor 11. The components which are additionally arranged on the rotor 10 of a generic tablet pressing machine, such as upper- and lower die guides and the upper and lower dies mounted therein, in addition to the associated actuating cams are not illustrated in FIG. 1, for reasons of simplicity, because they are not relevant to an understanding of the invention.

In addition, in FIG. 1 a material supply 20 is indicated diagrammatically, by means of which the generally powdery material is supplied to the matrices 14, formed in the matrix disc 12, for tabletting. The material supply 20 comprises here in the example embodiment which is shown a carrier part 30 which can be adjusted in its height relative to the matrix disc 14 of the rotor 12 by means of an adjustment device 32 which is not illustrated in FIG. 1. The carrier part 30 carries on the upper side a supply part 40 in which a supply opening 44 is formed for the powdery material.

In the example embodiment which is shown, the matrix disc 12 of the rotor 10 and the material supply 20 are arranged in a closed housing 60 which is integrated into the frame 64 of the tablet pressing machine 1 according to the invention. Closed is to be understood here to mean that the housing 60 is sealed by suitable closure arrangements such as windows or doors against an emergence of the powdery material which is to be tabletted by the tablet pressing machine according to the invention. A contamination of the environment of the tablet pressing machine 1 according to the invention by the powdery material which is to be tabletted is thereby ruled out. Generally, the interior of the closed housing 60 is accessible via doors (not illustrated), for example for maintenance and cleaning purposes.

The spraying device 62, which is arranged inside the closed housing 60, also serves for cleaning purposes. The spraying device 62 comprises a plurality of spray nozzles which are provided to spray a cleaning fluid, such as water for example, in the interior of the closed housing 60. The cleaning nozzles of the spraying device 62 are arranged here in the interior of the closed housing 60 so that practically the entire interior of the closed housing 60 is picked up by the spray mist of the cleaning fluid.

Figure 2:
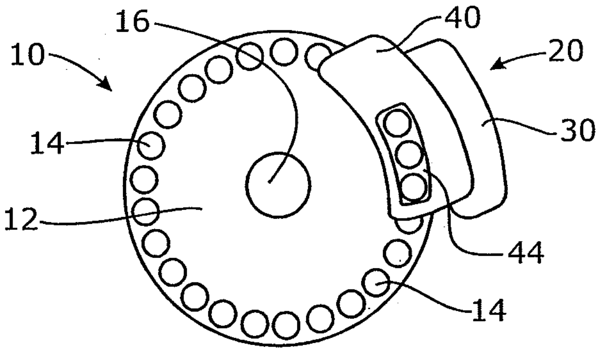
FIG. 2 shows a top view onto a matrix disc with a material supply according to the invention in place.

FIG. 2 now shows diagrammatically a top view onto the matrix disc 12 of the rotor 10 of the tablet pressing machine 1 according to the invention. The plurality of matrices 14, arranged at equal distances, can clearly be seen, which in the example embodiment are realized as separately constructed matrices 14. It can further be seen that the carrier part 30 of the material supply 20 is arranged adjacent to the matrix disc 12. The supply part 40 is mounted on the carrier part 30 and partially overlaps the matrix disc 12. The supply opening 44 which is formed in the supply part 40 and which overlaps a plurality of matrices 14 of the matrix disc 12 can also be seen.

Figure 3:
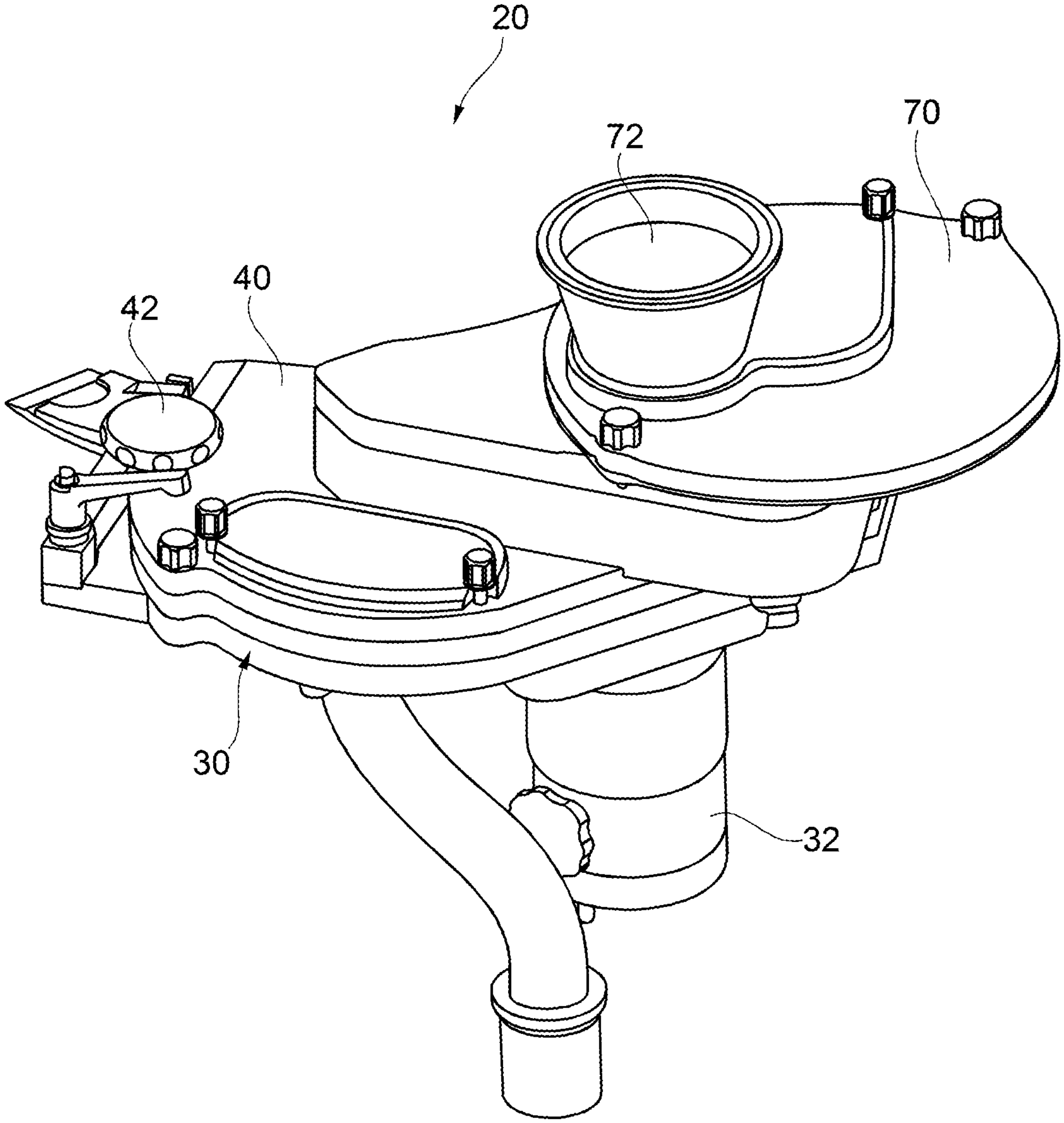
FIG. 3 shows a perspective illustration of a material supply according to the invention.

FIG. 3 now shows a perspective illustration of the material supply 20 according to the invention, which comprises a vertically adjustable carrier part 30 and a supply part 40 which is mounted on the upper side on the carrier part 30. The carrier part 30 is mechanically connected with the frame 64 of the tablet pressing machine 1 by means of a column-like element, with an adjustment device 32 being integrated into this column-like element, said adjustment device 32 permitting a vertical adjustment of the carrier part 30 in the manner of a micrometer screw. In particular the vertical position of the carrier part 30 relative to the upper side of the matrix disc 12 is adjustable by means of the adjustment device 32.

On the upper side on the carrier part 30, the supply part 40 of the material supply 20 is arranged, with the supply part 40 being secured by means of a manually operable fixing unit in the form of a capstan-head screw.

The powdery material which is to be tabletted is supplied to the supply opening 44, which is formed in the supply part 40 and is not visible in FIG. 3, by means of a portioning device 70 which is again arranged on the upper side of the supply part 40 and is motor-driven. The portioning device 70 comprises, in turn, a supply feed pipe 72 arranged on the upper side, to which the powdery material is supplied coming from above. In addition, a motor-driven transport disc which conveys the powdery material from the supply feed pipe 72 to the supply opening 44 of the supply part 40 rotates inside the portioning device 70.

Figure 4:
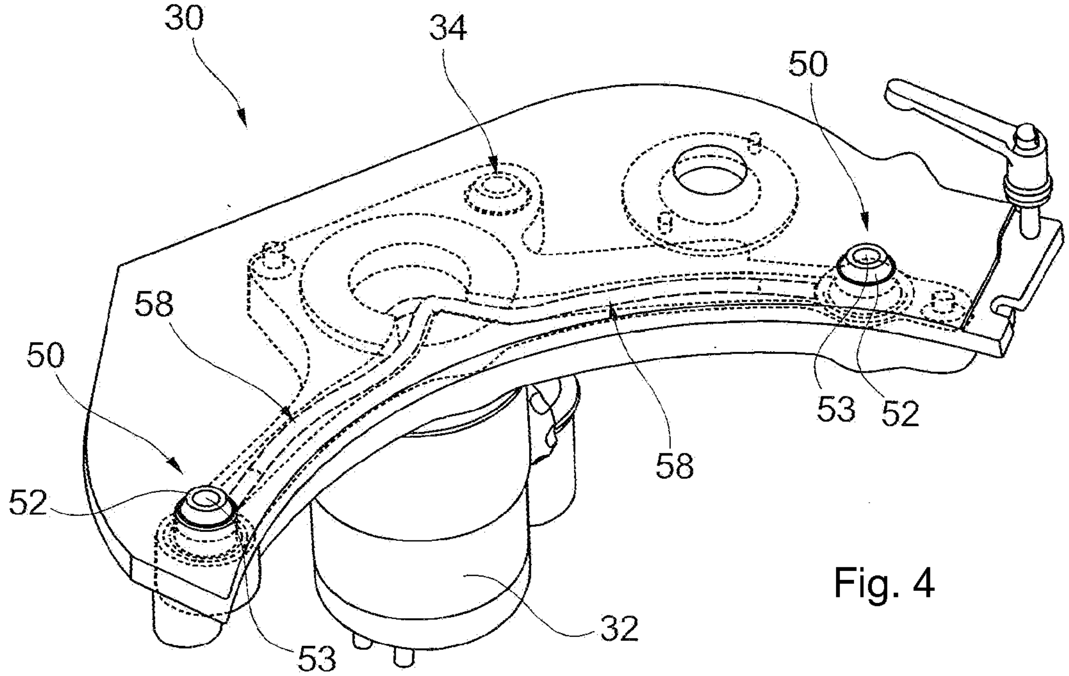
FIG. 4 shows a perspective illustration of the carrier part of the material supply of FIG. 3 in a view on the upper side.

FIG. 4 now shows a perspective illustration of the carrier part 30 of the material supply 20 according to FIG. 3 in a view on the upper side. The adjustment device 32, arranged on the underside, for setting the vertical position can be clearly seen. In addition two mounting parts 50 can be seen, which are arranged adjoining the contact region with the matrix disc 12 in the upper side of the carrier part 30. The mounting parts 50 are constructed as lifting cylinders 52 which are actuated by compressed air and which are supplied with compressed air via compressed air supplies 58. In addition, on the upper side of the carrier part 20 a mounting point 34 is arranged for a pin 48 which is constructed in a complementary manner on the supply part 40.

Figure 5:
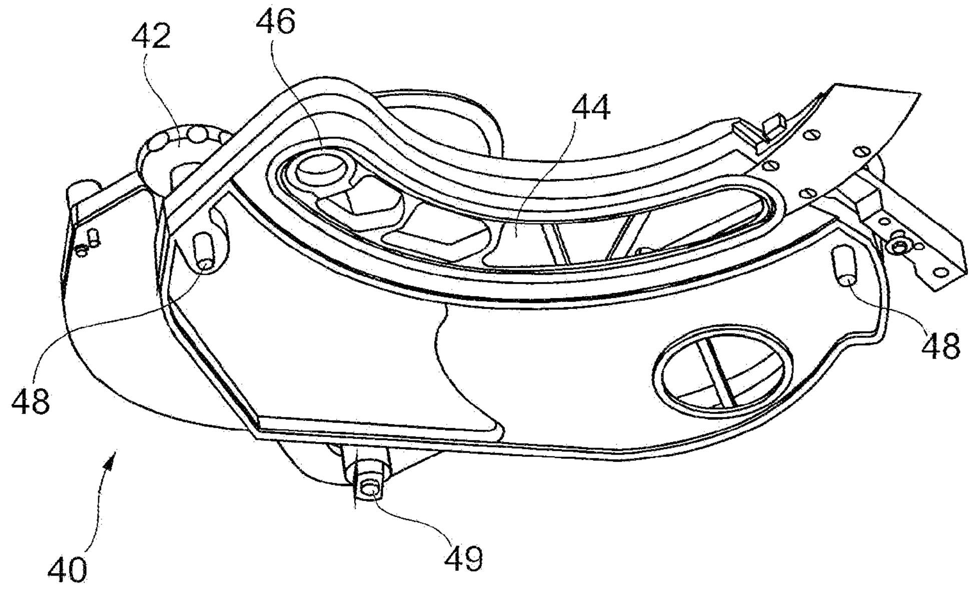
FIG. 5 shows a perspective illustration of the supply part of the material supply of FIG. 3 in a view on the underside.

FIG. 5 shows the supply part 40 of the material supply 20 according to FIG. 3 in a perspective illustration from below. The supply opening 44 can be clearly seen, to which on the upper side the powdery material which is to be tabletted is supplied by the portioning device 70 which can not be seen in FIG. 5. The supply opening 44 is embraced by an encircling seal 46, this being able to be, for example, a seal of a polymeric material.

In addition, the supply part 40 has three pins 48, 49 arranged on the underside. Here, two first pins 48 are constructed in a complementary manner to recesses 53, which extend in the ends lying at the top of the lifting cylinders 52 of the variable mounting parts 50. The additionally provided second pin 49 is constructed in a complementary manner to the mounting point 34 which is constructed in the carrier part 30. When the supply part 40 with the pins 48, 49 is placed onto the mounting parts 50, formed in the carrier part 30, and also onto the mounting point 34, then the material supply 20 according to the invention is formed. The mounting point 34 is fixed with respect to its three-dimensional position; on the other hand, the lifting cylinders 52 can carry out a lifting movement in the vertical direction. The first pins 48 and also the complementary recesses 53 in the lifting cylinders 52 are constructed so that a tilting movement of the supply part 40 onto the lifting cylinder 52 is possible. Accordingly also the combination of the second pin 49 and the mounting point 34 is developed so that a tilting movement of the supply part 40 on the carrier part 30 is possible. Finally, in addition a fixing unit 42 in the form of a capstan-head screw is constructed on one of the pins 48. An actuation of the capstan-head screw 42 secures the pin 48 in the complementary recess 53 in the lifting cylinder 52, with the mechanical connection being developed so that in addition a tilting movement of the supply part 40 on the carrier part 30 remains possible. By the actuation of the capstan-head screw 42, the supply part 40 is, however, secured mechanically on the carrier part 30.

In an alternative development which can not be seen from the figures, instead of a fixed mounting point 34 for the second pin 49, likewise a variable mounting part 50 is provided on the carrier part 30. As a whole, therefore, three mounting parts 50 are provided on the carrier part 30. By a simultaneous actuation of all three variable mounting parts 50, a pure vertical movement of the supply part 40 can be carried out. When the mounting parts 50 are developed accordingly such that a tilting movement of the pins 48, 49 is possible in the associated recesses 53 of the lifting cylinders 52, then by a different actuation of the lifting cylinders 52 likewise a tilting movement of the supply part 40 can be realized on the carrier part 30. Here, preferably a more intensive vertical movement of the supply part 40 is realized in the region adjoining the matrix disc 12, so that the supply part 40 rises particularly intensively here from the matrix disc 12.

Figure 6:
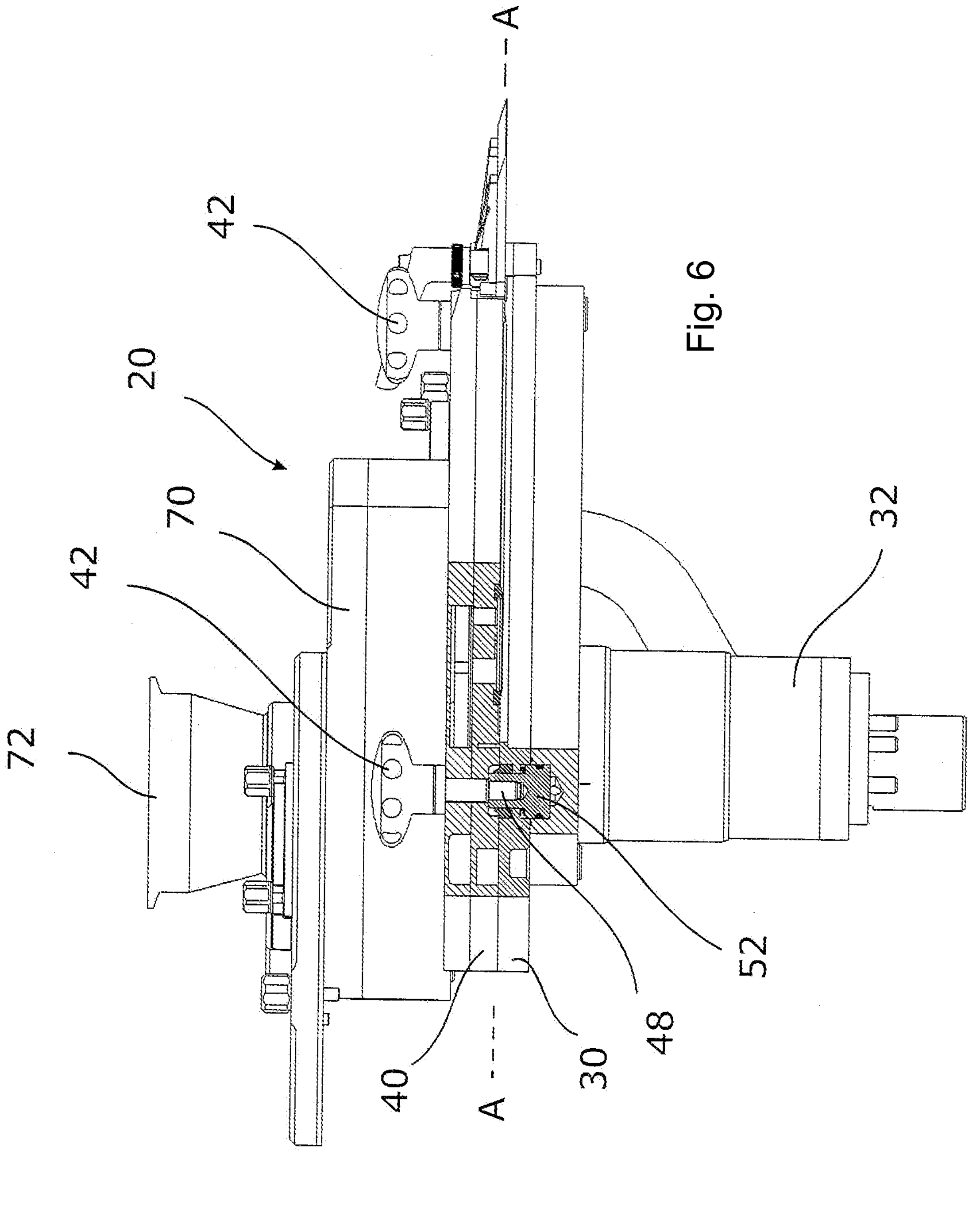
FIG. 6 shows a section through the material supply of FIG. 3.

FIG. 6 shows, in partial section, once again the material supply 20 according to FIG. 3, in which the carrier part 30 and supply part 40 are joined together to form a functional unit which is ready for use. The capstan-head screws 42 can be clearly seen, the ends of which, which are constructed as pins 48, engage into the recesses 53 in the lifting cylinders 52 of the carrier part 30. The dashed line which is marked by A-A marks the separation line between the supply part 40 and the carrier part 30 of the material supply 20. The carrier part 30 and the supply part 40 are separable from each other along this line.

Figure 7:
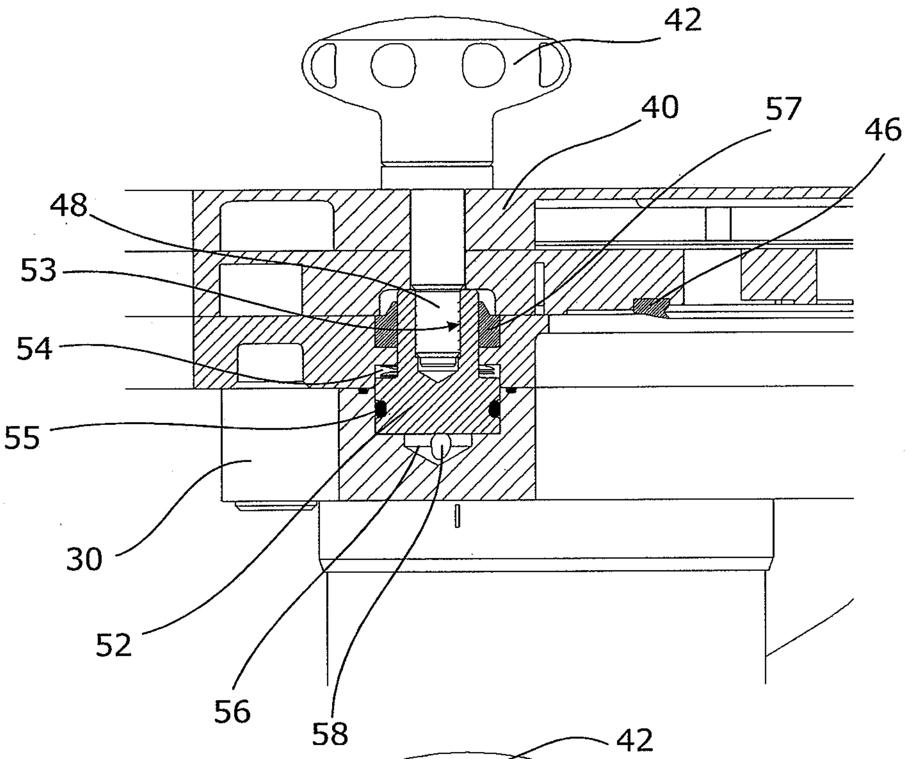
FIG. 7 shows an enlarged cutout of FIG. 6 in the operating position of the material supply.

FIG. 7 shows a cutout enlargement of FIG. 6, from which the structure of the mounting part 50 (illustrated cut) can be seen in detail. The mounting part 50 comprises a lifting cylinder 52 which is movable in the vertical direction. The prestressing of a pressure spring 54 is directed against its vertical movement. Here, the pressure spring 54 is constructed as a multimodal corrugated disc, i.e. as a corrugated disc which is shaped in a corrugated form, in which different undulation lengths are realized. Such a multimodal corrugated disc has the advantage that with use as a pressure spring it produces a substantially constant restoring force over a certain compression zone.

The lifting cylinder 52 is sealed by an encircling seal 55 against the compressed air duct 56 lying underneath. If the latter is acted upon by compressed air, then a vertical movement of the lifting cylinder 52 occurs against the restoring force of the pressure spring 54. The compressed air duct 56 of the illustrated mounting part 50 is acted upon by compressed air via a compressed air supply 58 which is not illustrated in FIG. 7, cf. with respect to this FIG. 4: on the upper side of the carrier part 30 the lifting cylinder 52 is sealed by a further seal 57 against, for example, the penetration of powdery material residues.

On the upper side, the lifting cylinder 52 forms a recess 53 into which the end, lying at the bottom and constructed as pin 48, of the capstan-head screw 42 engages, serving as a fixing unit. The supply part 42 is secured mechanically on the carrier part 30 by means of this capstan-head screw 42. FIG. 7 shows the material supply 20 according to FIG. 3 in the state of tablet pressing machine 1 according to the invention in the state when ready for operation. In this state, the seal 46 which is constructed as a sliding seal and which embraces the supply opening 44 in the supply part 40, lies on the matrix disc 12 which is not illustrated in FIG. 7, and thus seals the supply opening 44 against the area lying on the exterior.

Figure 8:
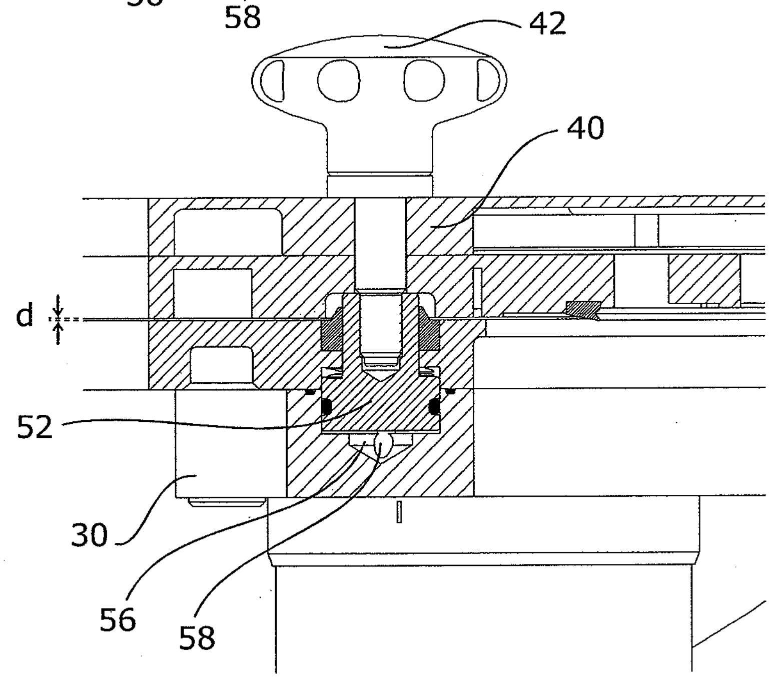
FIG. 8 shows the cutout of FIG. 6 in the cleaning position of the material supply.

FIG. 8, on the other hand, shows the material supply of FIG. 3 in its cleaning position, in which the compressed air ducts 56 of the two variable mounting parts 50 are acted upon with compressed air. Accordingly, the lifting cylinders 52 are deflected in the vertical direction. Hereby, a separation of the supply part 40 from the carrier part 30 occurs, which is indicated by dashed lines in FIG. 8 and is marked by "d".

It is pointed out that when the tablet pressing machine 1 according to the invention is ready for operation, an action of compressed air on the lifting cylinders 52 of the two mounting parts 50 can be entirely efficient technically, so that a certain separation d1 between carrier part 30 and supply part 40 results. This separation d1 can be pre-set here by a suitable selection of the pressure of the supplied compressed air acting on the lifting cylinder 52 and by suitable selection of the elasticity constant of the pressure spring 54. The separation d1 is preferably selected here so that a sufficient sealing is produced of the sliding seal 46 against the surface of the matrix disc 12, without an excessive material abrasion of the sliding seal 46 occurring.

A comparable effect can also be achieved by a seal 46 with a restoring effect being used instead of an application of compressed air of the lifting cylinders 52. The restoring force of this elastic seal 46 is precisely opposed to the restoring force of the pressure springs 54. By a suitable adaptation of the elasticity constants of the springs 46, 54 it is possible that even without an application of compressed air of the lifting cylinders 52 a certain (pre-settable) separation d1 occurs between the carrier part 30 and the supply part 40.

Both effects, which lead to a self-adjustment of the distance d1, can be used separately or else in combination. The distance d1 can be zero here, i.e. the seal 46 slides on the upper side of the matrix disc 12, or it can be not equal to zero, i.e. the seal 46 maintains a pre-set minimum distance from the upper side of the matrix disc 12.

In addition, capstan-head screws 42 can be constructed as setscrews which are secured in the vertical direction relative to the supply part 40, but can rotate freely in the bores in the supply part 40. At the same time, a thread can be provided in the recess 52 of the lifting cylinders 50, to that a rotary movement of the capstan-head screws 42 leads to an alteration of the relative vertical position of the supply part 40 and the lifting cylinders 50. This constitutes a development of a vertical adjustment device according to the invention of the supply part 40 on the carrier part 30 and can be used for example to set the separation d1 in the operating state. In the case of d1 being equal to zero, i.e. of a seal 46 sliding on the upper side of the matrix disc 12, its compression can be set and hence also the pressure force of the seal 46 on the matrix disc 12. Furthermore, the capstan-head screws also serve as a fixing unit, according to the invention, of the supply part 40 on the carrier part 30. Finally, in this way, the position of the supply part 40 on the carrier part 30 can be set in two or three spatial directions, by such a vertical adjustment device being realized on every variable mounting part 50.

In order to transfer the supply part 40 in this special development of the material supply 20 from the operating state into the cleaning state, the lifting cylinders 52 of the mounting parts 50 are acted upon by compressed air, or the pressure acting on the lifting cylinders 52 of the mounting parts 50 is then increased to such an extent that the lifting cylinders 52 overcome the opposing force of the pressure springs 54 and undergo their maximum vertical deflection. In this state, the maximum separation d2 of carrier part 30 and supply part 40 occurs in which, as was already mentioned above, this separation d2 can assume values between typically 0.5 mm and 5 mm.

Finally, it is pointed out that the seal 46, as already mentioned, can be a polymeric seal. In particular with a usage as a sliding seal, this can be pre-stressed against the surface of the matrix disc 12 by means of a separately constructed pressure spring which is not illustrated in FIGS. 7 and 8.

Alternatively, the sliding seal 46 can also be constructed as a metallic seal which can likewise be advantageously pre-stressed against the surface of the matrix disc 12 by means of a separately constructed pressure spring. Alternatively, it is also possible to select the shape of the metallic seal 46 so that an inherent elastic effect of the seal 46 is produced, so that a separate pressure spring for pre-stressing the seal 46 against the surface of the matrix disc 12 can be dispensed with. If, on the other hand, the seal 46 is not to be constructed as a sliding seal, then a mechanical pre-stressing means, such as a separately constructed pressure spring, can be entirely dispensed with.

What is claimed is:

1. A material supply for a tablet pressing machine with a rotor which includes a matrix disc, the matrix disc having a plurality of matrices in which the material supply supplies material to be tabletted to the matrices which are formed in the matrix disc, wherein:

the material supply comprises a carrier part and a supply part, in which:

a position of the carrier part relative to the matrix disc of the rotor is able to be fixed mechanically;

the supply part has a supply opening for the material to be tabletted and a seal, which at least partially encircles the supply opening and is arranged to lie between the supply part and the matrix disc:

and the supply part is mounted on the carrier part by means of three contact points, at least two of which comprise variable mounting parts which are arranged to enable self-adjustment of a position of the supply part to a pre-set position on the carrier part in two or three spatial directions.

2. The material supply of claim 1, wherein each of the variable mounting parts comprises a pressure spring.

3. The material supply of claim 1, wherein the seal comprises a metallic or a polymeric material.

4. The material supply of claim 2, wherein each of the variable mounting parts further comprises a pneumatically actuated lifting cylinder, and the pressure spring counteracts pneumatically actuated movement of the lifting cylinder.

5. The material supply of claim 2, wherein the pressure spring is a corrugated disc.

6. The material supply of claim 1, further comprising an adjustment device to allow the position of the carrier part to be set in at least a vertical direction.

7. The material supply of claim 6, wherein the adjustment device comprises a micrometer screw.

8. The material supply of claim 1, further comprising a fixing unit for mechanically fixing the supply part on the carrier part.

9. The material supply of claim 1, further comprising a vertical adjustment device for mechanically adjusting a vertical position of the supply part on the carrier part.

10. The material supply of claim 1, wherein the supply part can assume an operating position and a cleaning position, and is movable between these two positions by means of the at least two variable mounting parts.

11. The material supply of claim 4, wherein the supply part can assume an operating position and a cleaning position, and is movable between these two positions by a pressure application of the lifting cylinder.

12. The material supply of claim 1, wherein the third contact point is a fixed mounting part.

13. The material supply of claim 1, wherein all three contact points comprise variable mounting parts.

14. The material supply of claim 13, wherein the three variable mounting parts span one plane.

15. A tablet pressing machine with a rotor comprising a matrix disc in which a plurality of matrices is arranged and a material supply that supplies material to be tabletted to the matrices that are formed in the matrix disc, wherein:

the material supply comprises a carrier part and a supply part, in which:

a position of the carrier part relative to the matrix disc of the rotor is able to be fixed mechanically;

the supply part has a supply opening for the material to be tabletted and a seal, which at least partially encircles the supply opening and is arranged to lie between the supply part and the matrix disc; and the supply part is mounted on the carrier part by means of three contact points, at least two of which comprise variable mounting parts, which are configured to enable self-adjustment of a position of the supply parts to a pre-set position on the carrier part in two or three spatial directions.

16. The tablet pressing machine of claim 15, further comprising a sealed housing in which at least the matrix disc, the supply part of the material supply and a spraying device for a cleaning fluid are located.

17. The tablet pressing machine of claim 16, wherein the supply part can be transferred from an operating position into a cleaning position by means of the at least two variable mounting parts, wherein a distance of the supply part from an upper side of the matrix disc is variable between a first value d1 in the operating position, and a second value d2 in the cleaning position, and wherein d1 is greater than d2.

* * * * *